United States Patent
Gil Mollà

(10) Patent No.: US 10,066,598 B2
(45) Date of Patent: Sep. 4, 2018

(54) WIND TURBINE BLADE AND METHODS FOR TRANSPORTING, STORING AND INSTALLING WIND TURBINE BLADES

(71) Applicant: ALSTOM RENEWABLE TECHNOLOGIES, Grenoble (FR)

(72) Inventor: Isaac Gil Mollà, Barcelona (ES)

(73) Assignee: GE Renewable Technologies Wind B.V., Breda (NL)

( * ) Notice: Subject to any disclaimer, the term of this patent is extended or adjusted under 35 U.S.C. 154(b) by 258 days.

(21) Appl. No.: 14/427,284

(22) PCT Filed: Sep. 12, 2013

(86) PCT No.: PCT/EP2013/068934
§ 371 (c)(1),
(2) Date: Mar. 10, 2015

(87) PCT Pub. No.: WO2014/041086
PCT Pub. Date: Mar. 20, 2014

(65) Prior Publication Data
US 2015/0219070 A1    Aug. 6, 2015

Related U.S. Application Data

(60) Provisional application No. 61/725,831, filed on Nov. 13, 2012.

(30) Foreign Application Priority Data

Sep. 13, 2012  (EP) ..................................... 12382349

(51) Int. Cl.
F03D 1/06    (2006.01)
F03D 13/10   (2016.01)

(52) U.S. Cl.
CPC .......... *F03D 1/0675* (2013.01); *F03D 13/10* (2016.05); *F05B 2240/122* (2013.01); *Y02E 10/721* (2013.01); *Y10T 29/49318* (2015.01)

(58) Field of Classification Search
CPC ........ F03D 1/0675; F03D 1/001; F03D 13/10; B66C 1/42; B66C 1/44; F05B 2240/122; B21D 53/78
USPC ......................................................... 416/62
See application file for complete search history.

(56) References Cited

U.S. PATENT DOCUMENTS

| | | | |
|---|---|---|---|
| 6,502,693 B1 * | 1/2003 | Percival ................. | A47G 23/06 206/223 |
| 8,025,510 B2 * | 9/2011 | Bolshakov ........... | H01R 13/443 439/136 |
| 8,225,954 B1 * | 7/2012 | Triquet .................. | B65D 51/20 215/232 |

(Continued)

FOREIGN PATENT DOCUMENTS

CN    201 554 598    8/2010

OTHER PUBLICATIONS

International Search Report for PCT/EP2013/068934, dated Apr. 17, 2014, 11 pgs.

*Primary Examiner* — Aaron R Eastman
(74) *Attorney, Agent, or Firm* — Dority & Manning, P.A.

(57) ABSTRACT

A wind turbine blade having a blade surface comprising a pressure side and a suction side, comprising one or more flow disturbing devices for provoking air flow separation arranged on the suction side of the blade, wherein the flow disturbing device is removable.

19 Claims, 3 Drawing Sheets

(56) References Cited

U.S. PATENT DOCUMENTS

| | | | |
|---|---|---|---|
| 2005/0019166 A1* | 1/2005 | Bervang | B66C 1/108 |
| | | | 416/244 A |
| 2007/0266538 A1* | 11/2007 | Bervang | F03D 1/0658 |
| | | | 29/428 |
| 2008/0078128 A1* | 4/2008 | Livingston | F03D 1/001 |
| | | | 52/40 |
| 2008/0116321 A1 | 5/2008 | Tuinder | |
| 2008/0216301 A1* | 9/2008 | Hansen | B66C 1/108 |
| | | | 29/428 |
| 2009/0025219 A1* | 1/2009 | Hansen | B66C 1/108 |
| | | | 29/889 |
| 2009/0087314 A1* | 4/2009 | Haag | F03D 1/0633 |
| | | | 416/147 |
| 2010/0150684 A1* | 6/2010 | Pedersen | B66C 1/108 |
| | | | 414/10 |
| 2011/0094987 A1* | 4/2011 | Botwright | B66C 1/108 |
| | | | 212/274 |
| 2011/0187083 A1* | 8/2011 | Storgaard Pedersen | B60P 3/40 |
| | | | 280/638 |
| 2011/0223033 A1 | 9/2011 | Wang et al. | |
| 2012/0100005 A1* | 4/2012 | Ostergaard Kristensen | F03D 1/0608 |
| | | | 416/241 R |
| 2012/0124833 A1* | 5/2012 | Arendt | F03D 1/001 |
| | | | 29/889.7 |
| 2016/0327021 A1* | 11/2016 | Tobin | F03D 1/001 |

* cited by examiner

WIND TURBINE BLADE AND METHODS FOR TRANSPORTING, STORING AND INSTALLING WIND TURBINE BLADES

This application claims the benefit of European Patent Application EP12382349.4 filed Sep. 13, 2012 and U.S. Provisional Patent Application Ser. No. 61/725,831 filed Nov. 13, 2012.

The present invention relates to wind turbine blades, and more particularly relates to wind turbine blades comprising devices for disturbing the air flow over the blades. The invention further relates to a method for installing a blade in a wind turbine rotor, a method for transporting a wind turbine blade and a method for storing a wind turbine blade.

BACKGROUND ART

Turbine blades are those elements of wind turbines that serve to catch wind for then converting wind energy into electrical energy. A plurality of blades may be connected to the rotor. The working principle of the blades is similar to that of an airplane wing. The blades may have a varying cross-sectional profile of different airfoils along its length. The airfoil profile shape ensures that, during operation, air that flows over the blade produces a pressure difference between a suction side and a pressure side. Consequently, an aerodynamic force is exerted on the turbine blades.

A component of this aerodynamic force is the lift force, which is directed "upwards" (i.e. this force is directed from the pressure side towards the suction side). The lift force generates torque on the main rotor shaft, which. The rotation of the rotor shaft drives the generator rotor either directly ("direct driven") or through the use of a gearbox. The generator produces the electricity which may be fed into an electrical grid.

The lift force mentioned before is generated when the flow from the leading edge to the trailing edge creates a pressure difference between the top and bottom surfaces of the blade. Depending on the angle of attack the aerodynamic flow may be attached along the top surface (suction side) from the leading edge almost to the trailing edge.

The aerodynamic force exerted on the wind turbine blades as a result of the pressure difference between the pressure side and the suction side caused by an air flow may be counterproductive during manipulation (i.e. installation, transport, storage, etc.) of the wind turbine blades. For example, during installation of the wind turbine blade on a wind turbine rotor that is assumed to be already at its location on top of the tower. The afore-mentioned aerodynamic force exerted on the blade may provoke the oscillation of the blade during the hoisting of the blade. Thus, difficulties during the installation may arise, i.e. a lack of safety, possible damage to the blade or to any other part of the wind turbine, time delays during the installation process, etc. This may be even more problematic in offshore wind parks where the wind speeds are considerably higher than in onshore wind parks and they may exceed a predetermined maximum value at which it may not be possible to install the wind turbine blade, overall, when said blade is installed in a substantially vertical manner. This fact may provoke a considerable delay in the installation of the wind turbine blade and an increase of the costs.

In examples of the present invention, the afore-mentioned problems may be at least partially solved.

SUMMARY

In a first aspect, the present invention provides a wind turbine blade having a blade surface comprising a pressure side and a suction side. The blade comprises one or more flow disturbing devices for provoking air flow separation arranged on the suction side of the blade, and the flow disturbing device is removable.

The effect of air flow separation provoked by the one or more flow disturbing devices may substantially reduce or cancel the aerodynamic force exerted on the wind turbine blade during storage, transport or hoisting. After installation of the blade, the flow disturbing devices may simply be removed, and the blade may be used as usual without negative effects on operation.

In some embodiments, the flow disturbing devices may comprise an accessory by which it can be pulled so as to remove it from the blade surface. This accessory may permit the removal of the flow disturbing devices arranged on the suction side of the blade in a fast and easy manner. The accessory may comprise a wire, chain, cord, rope, etc. Furthermore, the accessory may comprise a handle, and thus an operator may remove the flow disturbing device from the suction side of the blade by pulling the handle. Such an operator could be positioned e.g. on a barge or on a platform in the case of installation of an offshore wind turbine.

In some embodiments, the flow disturbing devices may be attached to the blade surface by adhesive(s). Attaching the flow disturbing device to the blade surface using adhesive may facilitate and speed up the attachment and removal of said device.

In a second aspect, the present invention provides a method for installing a blade in a wind turbine rotor comprising a hub and a plurality of blades. The method comprises providing a wind turbine blade with at least one removable flow disturbing device for provoking air flow separation arranged on the suction side of the blade, installing the blade on the wind turbine rotor and removing the flow disturbing device from the suction side of the blade before operation of the wind turbine. During installation of the wind turbine blade to the wind turbine rotor, the aerodynamic force exerted on the wind turbine blade by typical wind speeds in offshore and onshore wind parks may be reduced due to the air flow separation. In consequence, an oscillation of the blade or a sudden movement caused by said aerodynamic force may be considerably decreased or even completely avoided.

In a third aspect, the present invention provides a method of transporting a wind turbine blade comprising providing a wind turbine blade, with at least one removable flow disturbing device for provoking air flow separation arranged on the suction side of the blade, and transporting it.

In a fourth aspect, the present invention provides a method of storing a wind turbine blade comprising providing a wind turbine blade, attaching at least one removable flow disturbing device for provoking air flow separation to the suction side of the blade surface, and storing the blade.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS

Figure 1:
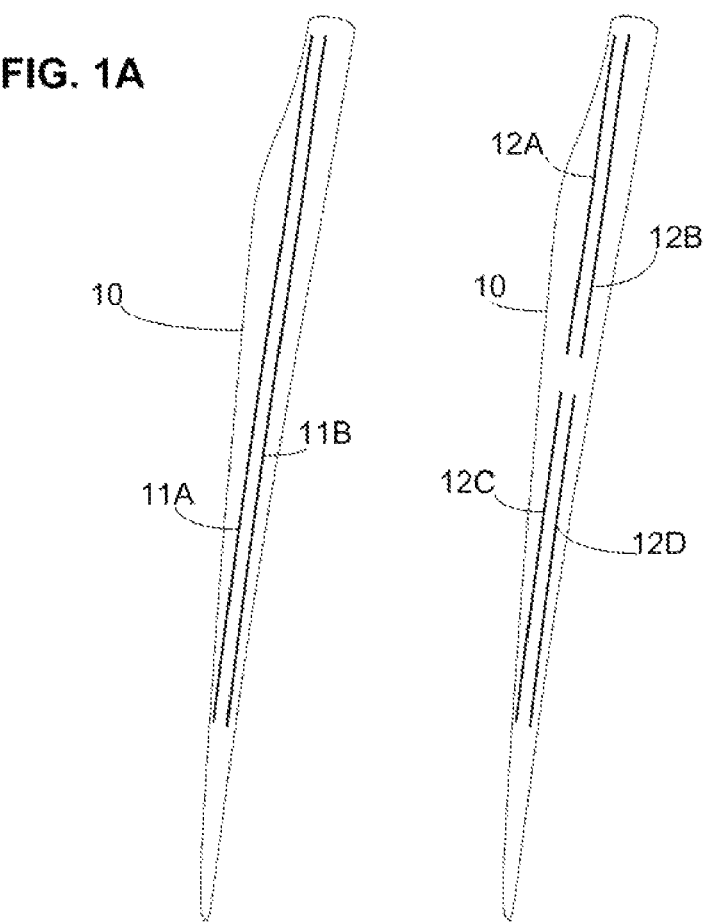
FIGS. 1A and 1B illustrate a blade comprising several flow disturbing devices for provoking air flow separation according to different embodiments of the present invention.

FIG. 1A shows a blade 10 comprising on its surface two elongated flow disturbing devices 11A and 11B for provoking air flow separation located on the suction side of said blade 10. For this particular embodiment, the two flow disturbing devices 11A and 11B are arranged along approximately 75% of the blade span. Device 11B is arranged at approximately 25% of the blade chord, and device 11A at approximately 50% of the blade chord.

The length of the flow disturbing device may be varied depending on e.g. the blade length, the aerodynamic profiles used, the aspect ratio of the blade and manufacturing aspects of the devices.

In alternative embodiments, at least one flow disturbing device may be arranged in the area of 5% to 40% of the blade chord and along at least 50% of the blade span.

The effect of the air flow separation provoked by the flow disturbing devices 11A and 11B may reduce the aerodynamic force exerted on the blade 10, and particularly of the lift of the blade. The cancellation of the aerodynamic force exerted on the blade 10 due to the air flow separation may allow an easier manipulation of the blade 10. The manipulation of the blade 10 may be related to the installation of the blade 10 in a wind turbine rotor which may comprise a hub and a plurality of blades.

In order to achieve an easier manipulation when installing the blade 10, for the particular embodiment of FIG. 1A, said blade 10 is provided with two flow disturbing devices 11A and 11B for provoking air flow separation and being said devices arranged on the suction side of the blade 10. Flow disturbing devices 11A and 11B may be attached to the suction side of the blade surface by adhesive means. Once the blade 10 is provided with the removable flow disturbing devices 11A and 11B, said blade 10 may be installed to the wind turbine rotor by hoisting said blade 10 towards the wind turbine rotor. The hoisting of the blade 10 toward the wind turbine rotor may be carried out e.g. by elevating the blade in a substantially vertical direction. When hoisting in the vertical direction, the effect of a wind gust causing lift on the blade could be most severe. In other embodiments, the process of elevating the blade may be carried out in a more inclined manner.

In some embodiments, and instead of individually lifting the blades to attach them to the hub already on top of the tower, the wind turbine rotor may be lifted onto the wind turbine tower with at least one blade previously attached. In such case, the at least one blade already attached may comprise one or more removable flow disturbing devices for provoking air flow separation arranged on the suction side of the blade, e.g. lifting the wind turbine rotor with three blades onto the wind turbine tower. The blades that are subsequently hoisted towards the hub already located on top of the tower may similarly comprise flow disturbing devices.

In some embodiments, the wind turbine rotor may be lifted with two blades already fitted, preferably in the so-called "bunny ear" configuration, onto the wind turbine tower and a third wind turbine blade with at least one removable flow disturbing device arranged on the suction side of the blade may be provided and installed to the wind turbine rotor by elevating said third blade in a substantially vertical manner.

Once the third blade is installed, the flow disturbing device(s) may be removed from the suction side of the third blade. Optionally, also the other two blades may have similar flow disturbing devices attached to them, during lifting of the rotor with the one or two blades. The flow disturbing devices of all blades are to be removed, or otherwise made inoperative, before operation of the wind turbine.

In some embodiments, the wind turbine rotor with two blades may be lifted together with the nacelle whereas, in some other embodiments, the nacelle may have been previously installed on top of the tower, so only the rotor with two blades is lifted at this stage.

Furthermore, easy manipulation of the blade 10 may also be desired when transporting said blade 10 on a train, truck or boat, or when storing said blade 10 and thus, also for these purposes, at least one flow disturbing device may be arranged on the suction side of the blade 10 by attaching said at least one flow disturbing device by e.g. adhesives. The flow disturbing devices may also be useful for storage and transport purposes: the forces generated by the blade in presence of winds may be reduced, so that storage installations may be simplified.

FIG. 1B shows an alternative configuration wherein the blade 10 comprises four elongated flow disturbing devices 12A, 12B, 12C and 12D for provoking air flow separation located on the suction side of said blade 10. In other examples, another number of flow disturbing devices may be used.

Figure 2:
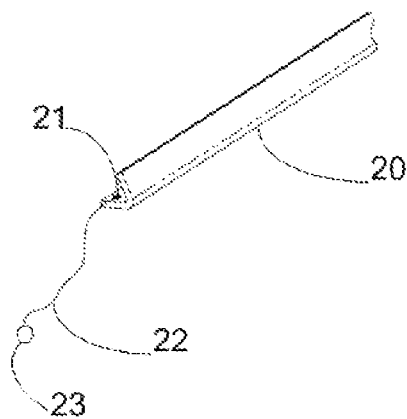
FIG. 2 illustrates a flow disturbing device according to an embodiment of the present invention.

FIG. 2 shows a flow disturbing device 20 made of two elongated strips forming an angle of less than 90 degrees, e.g. between 45° and 90°, with each other. Furthermore, the flow disturbing device 20 comprises an accessory by which it can be pulled so as to remove it from the blade surface. This accessory comprises a wire 22 with a handle 23. This accessory may permit the removal of the flow disturbing device 20 arranged on the suction side of the blade in a fast and easy manner. Moreover, this accessory may permit to carry out the removal of the flow disturbing device 20 from a nearby location, e.g. from a boat. In same embodiments, the accessory may comprise a chain, cord, rope or other suitable material.

For example, an operator who stays away from the wind turbine blade may remove the flow disturbing device 20 from the suction side of the blade by pulling the wire 22 with the handle 23 when the flow disturbing device 20 is attached to the suction side of a blade. In this particular embodiment, the flow disturbing device 20 furthermore comprises an orifice 21 which avoids the displacement of the wire 22. The flow disturbing device 20 may be made of a plastic material as e.g. rubber, polyurethane, etc. and it may be attached to the suction side of the blade by adhesive means.

In another example, instead of using two elongated strips forming an angle of between 45° and 90°, a single strip that is arranged in a manner substantially perpendicular to the blade may be used. In further alternative examples, the flow disturbing device may have yet different shapes and sizes. For example, they may be of triangular or rectangular cross-section.

Figure 3A:
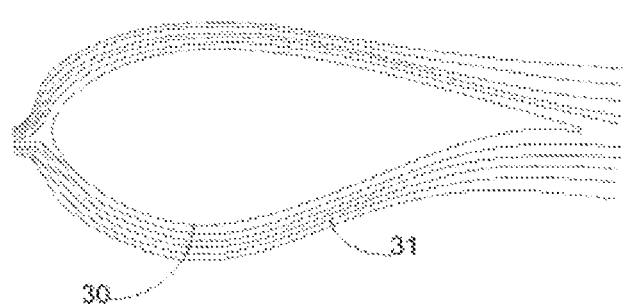
FIGS. 3A and 3B illustrate a chord-wise section through an airfoil portion of a wind turbine blade without and with several flow disturbing devices, respectively and the effect provoked by said devices in the air flow.

FIG. 3A shows a chord-wise section through an airfoil portion 30 of a wind turbine blade in which air flow 31 over said blade can be appreciated. The air flow 31 over the blade may produce a pressure difference between the sides of the blade (suction side and pressure side). Consequently, a lift force, which is directed upwards (from a pressure side towards a suction side), acts on the blade. The flow along the airfoil shown in FIG. 3A is substantially laminar.

Figure 3B:
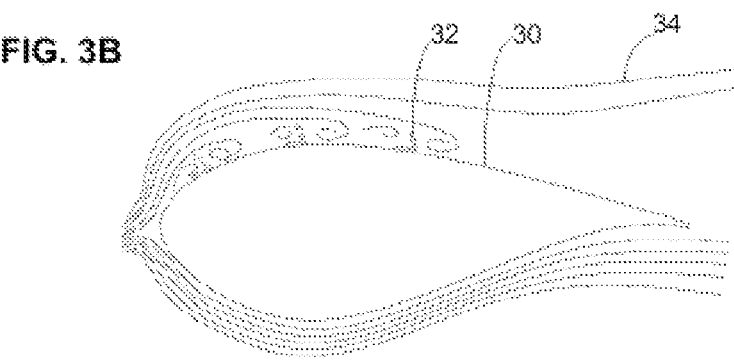

FIG. 3B shows a chord-wise section through an airfoil portion 30 of a wind turbine blade comprising a plurality of flow disturbing devices 32 arranged on the suction side of the blade. In this figure, air flow separation due to the arrangement of the flow disturbing devices 32 on the suction side of the blade can be appreciated. Depending on the aerodynamic profile, and angle of attack, a first flow disturbing device may cause a boundary flow separation and a transformation of a laminar boundary flow to a turbulent flow. There is a chance that such a turbulent boundary flow may reattach to the airfoil. In some cases, additional flow disturbing device may be located downstream to avoid such a re-attachment of the flow.

The air flow separation provoked by the flow disturbing devices 32 may reduce particularly the lift of the blade when subjected to winds. This reduction of aerodynamic forces may facilitate the manipulation, i.e. installation, transport, storage of the wind turbine blade.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A wind turbine blade having a blade surface comprising a pressure side and a suction side, comprising:
 a flow disturbing device arranged on an outer surface of the suction side of the wind turbine blade with a releasable adhesive applied between the flow disturbing device and the outer surface, the flow disturbing device comprising a first elongated member attached to the suction side of the wind turbine blade and extending along at least a portion of a span of the wind turbine blade and a second elongated member attached to a first end of the first elongated member and extending away from the suction side of the wind turbine blade at an acute angle to the first elongated member so as to induce air flow separation to reduce or cancel aerodynamic force exerted on the wind turbine blade during storage, transport, or hoisting of the wind turbine blade,
 wherein the releasable adhesive provides for the flow disturbing device to be removed from the wind turbine blade by pulling the flow disturbing device away from the wind turbine blade before functional operation of the wind turbine blade on a wind turbine, and
 an accessory removal device attached to the flow disturbing device, the accessory removal device extending away from the flow disturbing device and extending along the outer surface of the suction side of the wind turbine blade, the flow disturbing device can be pulled by the accessory removal device so as to remove the flow disturbing device from the wind turbine blade surface.

2. The wind turbine blade according to claim 1, wherein the accessory comprises a wire, chain, cord or rope.

3. The wind turbine blade according to claim 2, wherein the accessory further comprises a handle.

4. The wind turbine blade according to claim 1, wherein the flow disturbing device is made of a plastic material.

5. The wind turbine blade according to claim 1, wherein the flow disturbing device extends along 5%-40% of a total blade chord.

6. The wind turbine blade according to claim 1, wherein the flow disturbing device is arranged along at least 50% of a blade span.

7. The wind turbine blade according to claim 1, comprising two or more of the flow disturbing devices.

8. The wind turbine blade according to claim 1, wherein the flow disturbing device comprises two elongated strips forming an angle of less than 90 degrees with each other.

9. The wind turbine blade according to claim 1, wherein the flow disturbing device is made from a foam material.

10. The wind turbine blade according to claim 1, wherein the first end of the first elongated member is a spanwise trailing edge-side end of the first elongated member.

11. The wind turbine blade according to claim 1, wherein the second elongated member extends along the entire first end of the first elongated member.

12. The wind turbine blade according to claim 1, wherein the first and second elongated members form an L-shaped member.

13. A method for installing a wind turbine blade in a rotor of a wind turbine, the rotor having a hub, the method comprising:
 providing the wind turbine blade with at least one removable flow disturbing device arranged on an outer surface of a suction side of the wind turbine blade with a releasable adhesive, the flow disturbing device comprising a first elongated member that is attached to the suction side of the wind turbine blade and that extends along at least a portion of a span of the wind turbine blade and a second elongated member that is attached to a first end of the first elongated member and that extends away from the suction side of the wind turbine blade at an acute angle to the first elongated member so as to induce air flow separation to reduce or cancel aerodynamic force exerted on the wind turbine blade during storage, transport, or hoisting of the wind turbine blade;
 installing the wind turbine blade on the rotor including hoisting the wind turbine blade towards the rotor; and
 removing the flow disturbing device from the suction side of the wind turbine blade before starting operation of the wind turbine by pulling an accessory removal device, the accessory removal device being attached to the flow disturbing device, the accessory removal device extending away from the flow disturbing device and extending along the outer surface of the suction side of the wind turbine blade, wherein the releasable adhesive provides for removal of the flow disturbing device from the wind turbine blade by pulling on the accessory removal device.

14. The method according to claim 13, wherein hoisting the wind turbine blade towards the rotor comprises elevating the wind turbine blade in a substantially vertical direction.

15. A method for installing a wind turbine rotor, the rotor having a hub, the method comprising installing at least one wind turbine blade on the rotor in accordance with the method of claim 13; and
 further comprising lifting the rotor onto a wind turbine tower with the at least one wind turbine blade attached to the rotor.

16. The method according to claim 15, comprising lifting the rotor with two of the wind turbine blades onto the wind turbine tower, and further comprising:

providing a third wind turbine blade with at least one the removable flow disturbing device arranged on the suction side of the third wind turbine blade;

installing the third wind turbine blade to the rotor by elevating the third wind turbine blade in a substantially vertical manner; and removing the flow disturbing device from the suction side of the third wind turbine blade.

17. The method according to claim 16, wherein the rotor with two wind turbine blades is lifted together with a nacelle.

18. The method according to claim 15, comprising lifting the rotor onto the wind turbine tower with three wind turbine blades attached to the rotor.

19. A method of transporting a wind turbine blade comprising:

providing the wind turbine blade with at least one removable flow disturbing device arranged on an outer surface of a suction side of the wind turbine blade with a releasable adhesive, the flow disturbing device comprising a first elongated member that is attached to the suction side of the wind turbine blade and that extends along at least a portion of a span of the wind turbine blade and a second elongated member that is attached to a first end of the first elongated member and that extends away from the suction side of the wind turbine blade at an acute angle to the first elongated member so as to induce air flow separation to reduce or cancel aerodynamic force exerted on the wind turbine blade during transport;

attaching an accessory removal device to the flow disturbing device, the accessory removal device extends away from the flow disturbing device along the outer surface of the suction side of the wind turbine blade, wherein the releasable adhesive provides for removal of the flow disturbing device from the wind turbine blade by pulling on the accessory removal device;

transporting the wind turbine blade; and using the accessory removal device to remove the flow disturbing device from the wind turbine blade.

\* \* \* \* \*